United States Patent [19]
Kanner et al.

[11] Patent Number: 5,713,242
[45] Date of Patent: Feb. 3, 1998

[54] ACTUATING MECHANISM FOR FLUID DISPLACEMENT AND PRESSURIZING DEVICE

[75] Inventors: Rowland W. Kanner; Richard M. Davis, both of Guntersville, Ala.

[73] Assignee: Atrion Medical Products, Inc., Arab, Ala.

[21] Appl. No.: 504,519

[22] Filed: Jul. 20, 1995

[51] Int. Cl.⁶ ........................................... F16H 1/18
[52] U.S. Cl. ...................... 74/424.8 A; 74/499; 74/567; 604/100
[58] Field of Search .................. 74/424.8 A, 499, 74/567; 604/98, 99, 100, 118

[56] References Cited

U.S. PATENT DOCUMENTS

| | | | |
|---|---|---|---|
| 4,370,982 | 2/1983 | Reilly | 604/100 |
| 4,723,938 | 2/1988 | Goodin et al. | 604/100 |
| 4,838,864 | 6/1989 | Peterson | 604/100 |
| 5,168,757 | 12/1992 | Rabenau | 73/714 |

FOREIGN PATENT DOCUMENTS

WO9217221 10/1992 WIPO ..................... 604/100

Primary Examiner—Charles A. Marmor
Assistant Examiner—David M. Fenstermacher
Attorney, Agent, or Firm—Trexler, Bushnell, Giangiorgi & Blackstone, Ltd.

[57] ABSTRACT

Actuating mechanism for rapidly and selectively moving a threaded screw and nut member combination into or out of threaded engagement, particularly for use of the screw as a control fluid plunger to pressurize angioplasty balloon catheters, or the like, which mechanism includes a housing and a threaded screw slideably displaceable through the housing, and a nut member having partial threads engageable and disengageable with the threaded screw structure. A carriage structure is secured to the nut structure and arranged to enable reversibly translating motion together with the nut member relative to the screw structure to enable the selectively threaded engageability of the partially threaded nut member with the screw structure.

15 Claims, 4 Drawing Sheets

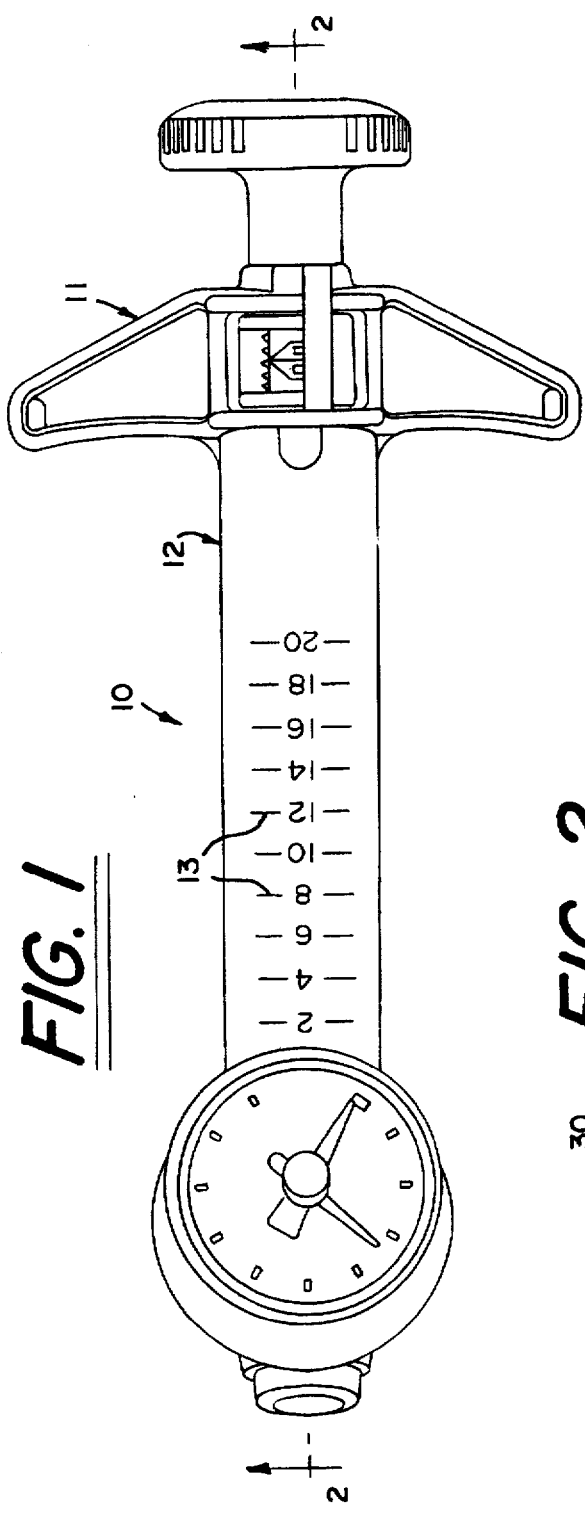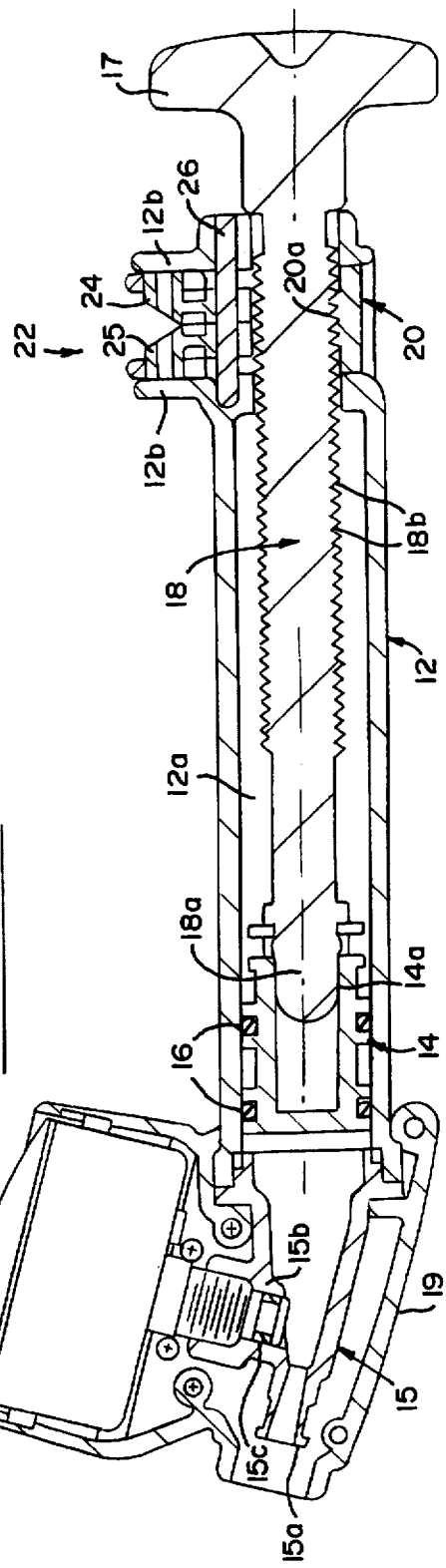

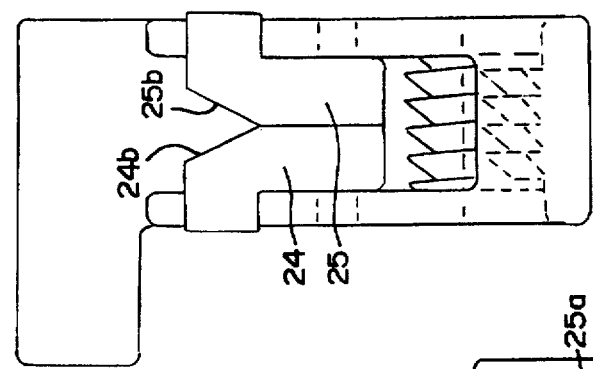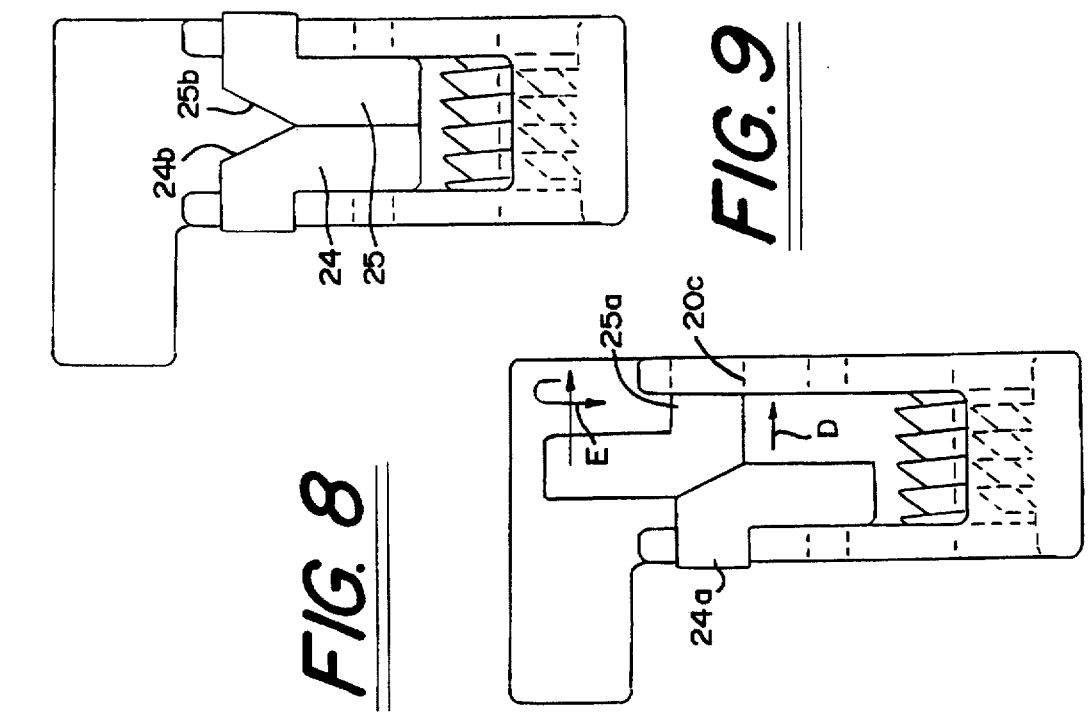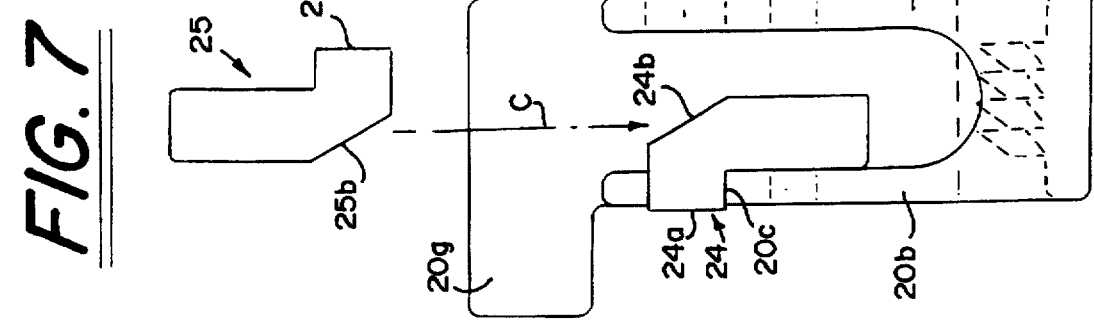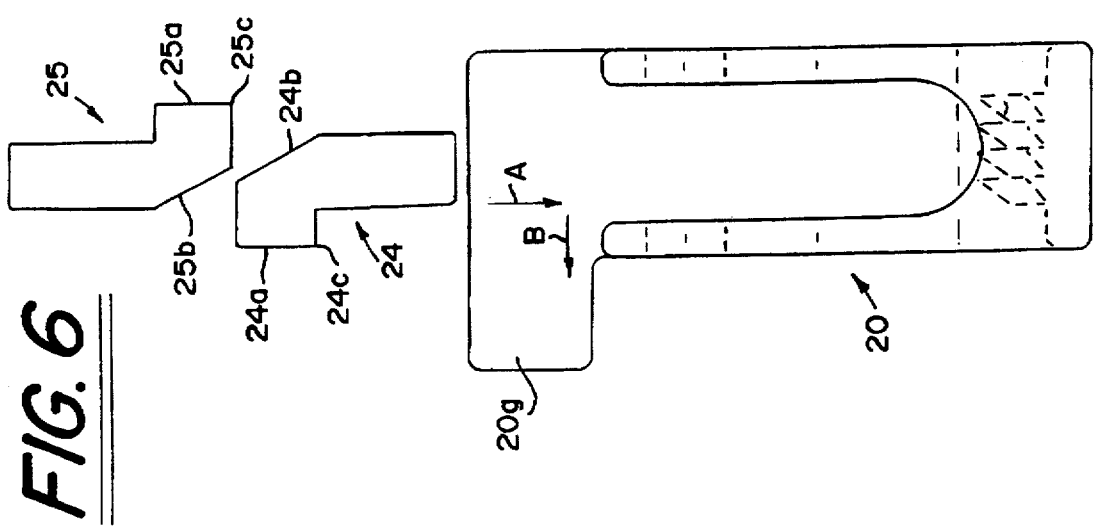

ACTUATING MECHANISM FOR FLUID DISPLACEMENT AND PRESSURIZING DEVICE

BACKGROUND OF THE INVENTION

This invention relates to fluid pressurizing devices for balloon catheters or the like, and more particularly relates to improved devices for actuating the screw plunger and monitoring the resulting fluid pressurization.

Fluid pressurization devices adapted for selectively applying and relieving a measured pressure on a closed volume of fluid have been developed for use in inflation and deflation for angioplasty balloon procedures interiorly of blood vessels. As described for example in U.S. Pat. 4,838,864, a syringe device inflates and deflates the catheterized balloon using a manually operated screw plunger to achieve or maintain specific pressure within the balloon which is monitored with an integral pressure gauge. Improved syringing and pressurization control is also described in U.S. Pat. No. 5,168,757, incorporated herein by reference, in which a quick release mechanism enables rapid advancement of the threaded screw plunger and alternatively allows threaded engagement with the screw plunger to achieve precise control during final pressurization of the balloon catheter. The present invention provides further improved mechanism for selective engagement and disengagement of the screw plunger.

SUMMARY OF THE INVENTION

In accordance with the present invention, actuating mechanism for rapidly and selectively moving a threaded screw and nut member combination into or out of threaded engagement, particularly for use of the screw as a control fluid plunger to pressurize angioplasty balloon catheters, or the like, includes a housing and a threaded screw means slideably displaceable through the housing, and a nut member having partial threads selectively engageable and disengageable with the threaded screw structure. A carriage structure is integral with the nut structure and arranged to enable reversibly translating motion with the nut member relative to the screw structure to enable the selectively threaded engageability with the screw structure.

In one embodiment, the integral carriage structure is secured to the nut member and is bifurcated to provide a pair of opposingly spaced mounting portions extending from the partially threaded portion of the nut member. The mounting portions of the integral carriage structure are coupled to the housing by a pair of adjacently arranged link members which are separately coupled to the respective mounted portions and are disposed therebetween while operated in tandem to guide the translating motion of the nut member in the selectively threaded engageability with the screw structure. It should be noted that the nut member of the first embodiment to be described will in actuality move within a plane in a diminishing curved path in traveling between the engaged position (FIG. 5) and the disengaged position (FIG. 4). For ease of description, this movement is referred to herein as translating motion. The path of movement of the nut member of the second embodiment illustrated and described (FIGS. 10 and 11) will more closely approximate vertical sliding movement within a plane.

In another aspect of the invention, a method for assembling the link members to the carriage structure provides separate coupling of each link member to a respective mounting portion of the bifurcated carriage structure.

In another embodiment according to the invention, a lever member is disposed between the bifurcated mounting portions of the carriage structure which is driven by a cam structure on the lever member in the selectively reversible sliding motion of the nut member secured to the carriage structure.

BRIEF DESCRIPTION OF THE DRAWINGS

FIG. 1 is a top plan view of one embodiment of an inflated device and actuating mechanism in accordance with the present invention;

FIG. 2 is a sectional view along a plane indicated by line 2—2 in FIG. 1;

FIGS. 6–9 are sequential views showing progressive steps in assembly of coupling and nut structures of the actuating mechanism shown in FIGS. 1–5.

DETAILED DESCRIPTION OF THE PREFERRED EMBODIMENTS

Figure 4:
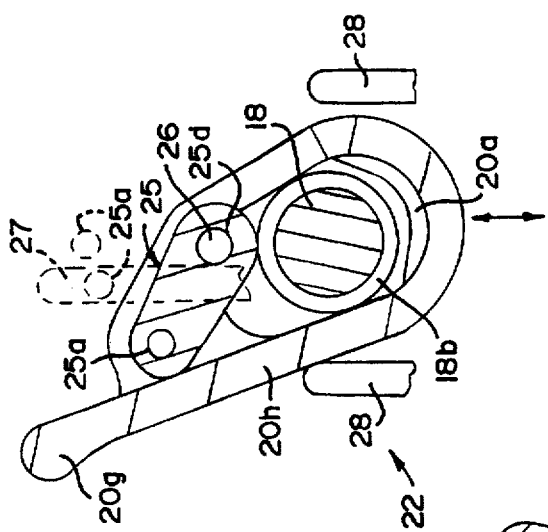
FIGS. 4 and 5 are enlarged sectional views of the actuating mechanism shown in FIG. 3, showing two reversible operating positions of the actuating mechanism.

Referring to FIGS. 1 and 2, an embodiment of an inflator device in accordance with the present invention is designated generally by reference character 10. The inflator device 10 has a generally cylindrical syringe body and fluid displacement chamber 12, with integral handle 11, which chamber 12 is transparent for viewing the fluid within the cavity 12a during fluid aspiration or dispensing. Accordingly, the syringe body 12 is molded, with volumetric indicia 13, for transparency from polycarbonate or similarly suitable resins. A piston 14 is slideably displaceable within the syringe body 12 and carries a pair of peripherally mounted O-ring fluid seals 16 for pressure retention and the prevention of-leakage past the piston 14. The chamber 12a communicates with a fluid conduit fitting 15, within a clamping cover 19, which communicates with both the balloon catheter structure (not shown) by means of integral fluid connection 15a and with a pressure gauge assembly 30 threaded into fluid coupling 15b with sealing O-ring 15c. The pressure monitoring gauge 30 provides the physician with an indication of the pressure in the fitting 15 and balloon catheter. The pressure monitoring gauge can be of any suitable type for either angioplasty or for other employment.

As best shown in FIG. 2, piston 14 is mounted on an unthreaded, pilot nose end 18a of a threaded screw plunger 18. The screw plunger 18, FIG. 1, has an integral palm knob 17 to facilitate movement thereof. The pilot nose end 18a freely rotates within a central journal cavity 14a of the piston 14. The piston 14 is mounted on the pilot nose end 18a in a snap-action, interference coupling which prevents end 18a from withdrawing or backing out of the piston opening when the screw 18 is retracted to aspirate fluid into the cavity 12a, as more fully described hereinafter. The pilot nose end 18a is freely rotatable relative to the coupled piston 14 so that the piston is linearly advanced or retracted without rotation relative to the rotation oft he screw 18 in threaded advancement or retraction, in order to prevent any leakage of pressurized fluid from the cavity 12a between the piston O-rings 16 and the syringe body 12.

Figure 5:
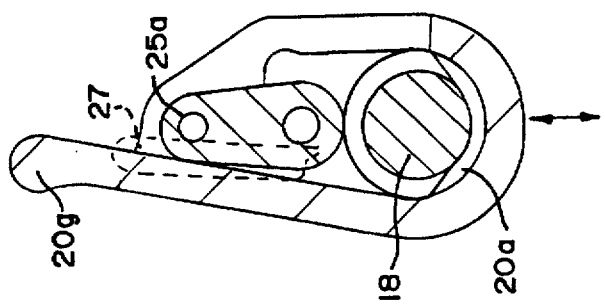

Referring again to FIGS. 1 and 2, a nut structure generally designated by reference character 20 is mounted in the rearward portion of the syringe body 12 and has partially formed threads 20a which are selectively engageable and disengageable from the threads 18b of screw 18 by displacement of the entire nut structure 20 in a translating motion, as best shown in FIG. 5, in comparison with the threaded engagement of the nut and screw threads 20a, 18b shown in FIG. 4. Again, the motion of the nut member in moving between the positions of FIGS. 4 and 5 is in actuality that of a diminishing curved path and, as such, is not truly linear. The nut structure 20 and threads 20a are selectively disengaged from the screw 18 in order to permit manual rapid displacement of the screw 18 and piston 14 particularly for aspiration of saline solution into the syringe cavity 12a from the fluid connection coupling 15a and connected saline supply reservoir (not shown). The disengagement of the nut and threads 20a also enable a rapid advancement of the screw 18 and piston 14 to discharge solution from the cavity 12a through coupling 15a when connected to inflate an angioplasty balloon (not shown, which has been previously positioned within a blood vessel or heart valve using a balloon catheter). Rapid retraction of the screw 18 and piston 14 also enable swift aspiration of the fluid into the cavity 12a for rapid deflation of a balloon. Also, prior to connection to the catheter, the screw 18 may be operative to insure that all air bubbles have been eliminated from the sterile saline fluid within de unit 10. As previously mentioned, the transparency of the syringe body 12 enables visual confirmation that no air bubbles have been drawn with fluid supply aspiration into the cavity 12a, or if drawn, bubbles have been eliminated.

In order to enable the selective engagement (FIG. 5) or disengagement (FIG. 4) of partial nut threads 20a with the screw threads 18b, the nut structure 20 is selectively displaceable by manually activating a nut release mechanism generally designated by reference character 22 in FIG. 2. The release mechanism 22 is mounted between a pair of spaced flanges 12b transversely extending from the syringe body 12.

The release mechanism 22 is activated by manually grasping and displacing a grip portion 20g molded on the nut structure 20 which is guided in a reversibly translating motion between the positions shown in FIGS. 4 and 5, as further explained hereinafter.

Figure 3:
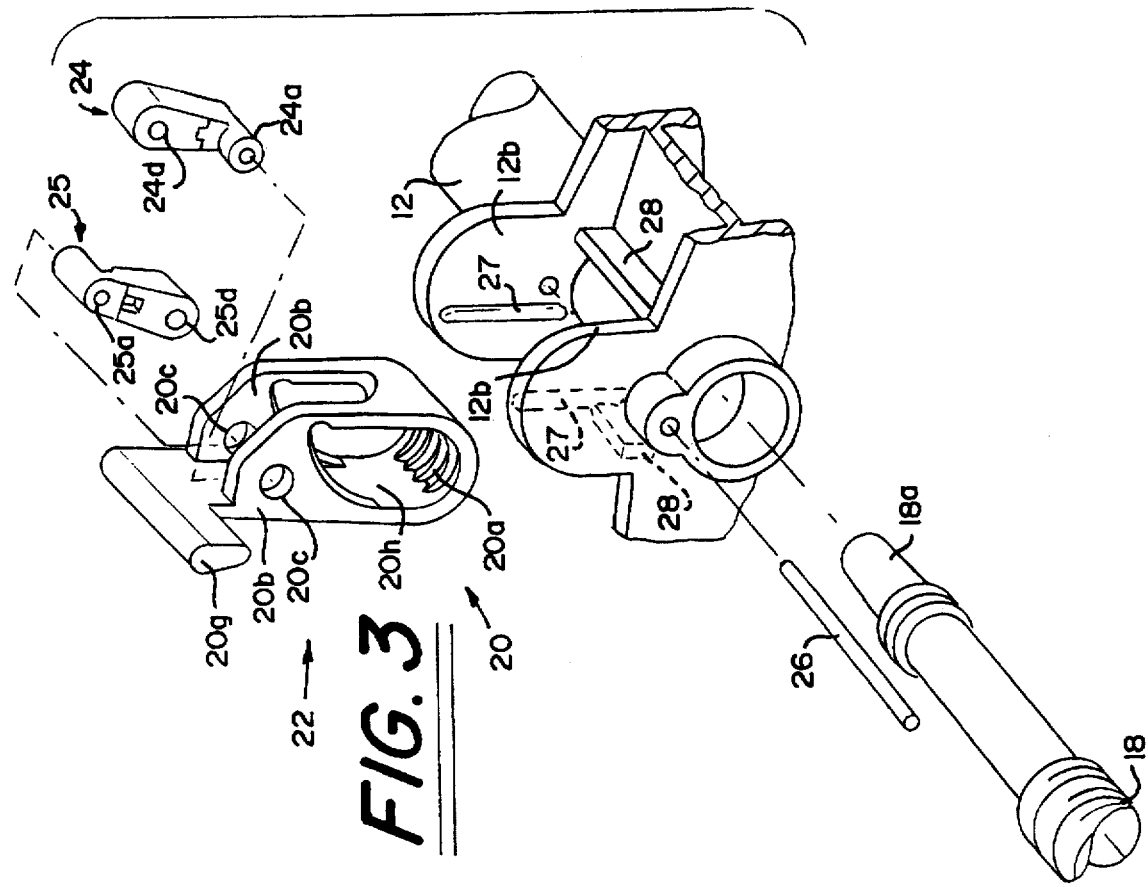
FIG. 3 is a fragmentary, exploded perspective view of an actuating mechanism shown in FIGS. 1 and 2.

As viewed in FIGS. 3, 4 and 5, the nut structure 20 includes partial threaded portion 20a formed in a lower base portion and also includes an upstanding, bifurcated portion forming a pair of spaced, elongate arm or mounting portions 20b, which arms or mounting portions in effect define the carriage structure that is integral with the partially threaded portion 20a. The mounting portions 20b each have a large aperture 20h through which the screw 18 extends. FIG. 4 illustrates the release position of the nut structure 20 in which the threads of the partially threaded portion 20a are disengaged from the screw thread 18b. FIG. 5 illustrates the engaged position of the nut structure 20 in which the threads 20a and 18b of the nut structure and screw are engaged for incremental screw motion operated by the integral palm knob 17. The reversibly translating motion of the nut structure 20 between the release and engaged positions of FIGS. 4 and 5 is guided to the screw 18 under the guidance of a link structure provided by two link members 24 and 25 which are positioned and operated in tandem. As shown in FIGS. 2 and 9, the link members 24 and 25 are secured in adjacent, opposing alignment by a beating pin 26 which is secured within the syringe body 12 and bridges the base of the spaced flanges 12b. The link members 24 and 25 are journaled on the pin 26 at one end thereof and at the opposite end of each link member 24 and 25, an integral shaft portion 24a and 25a, respectively, which shaft portions are journaled in alignment within respective mounting arms 20b of the carriage portion of the nut structure 20. The shaft portions 24a and 25a thus rotatably couple the link members 24 and 25 to the translating motion of the nut structure 20, as shown in FIGS. 4 and 5, so that the nut structure motion is constrained by the link members 24 and 25 which must rotate on the bearing pin 26.

When the nut structure 20 is most tightly engaged with the screw 18 as shown in FIG. 5, the translating motion of the grip portion 20g which extends from the carriage portion provided by the integral arms 20b can terminate in an "over-center"locking position which ensures that any slight motion of the nut structure 20 which could be induced by fluid pressure in the cavity 12a imposed on the screw 18 will result in tighter engagement of the screw 18 and nut structure 20 rather than any tendency for loosening or disengagement thereof. The engaged position of FIG. 5 is releaseably locked by a pair detent structures in the form of raised ribs 27 projecting inwardly between each of the housing flange portions 12b.Each of the link member shaft portions 24a and 25a slightly project from the journaling apertures 20e so that the ends of the shafts 24a and 25a must slide across the projecting detent fibs 27 in an interference engagement and resilient wedging motion which slightly further spreads the housing flanges 12b requiring deliberately forceful manual deflection of the grip portion 20g to drive the vertical sliding movement of the nut structure 20 between the screw disengagement and screw engagement positions of the nut structure 20 represented in FIGS. 4 and 5, respectively. Accordingly, the threaded engagement position of the nut structure shown in FIG. 5 in which the link member shaft ends have cleared the respective detent fibs 27 will then require significant and deliberate manual force on the grip portion 20g for motion of the nut structure 20 into the thread-disengaged position of FIG. 4. When the slidable motion of the nut structure 20 into the completely disengaged thread position of FIG. 4 is reached, the exterior surface of the nut structure side wall 20h becomes abutted against a longitudinally aligned housing flange 28 which serves as a stop for the sliding motion of the nut structure 20g there at, in which position the screw 18 is freely slidable through the housing for rapid fluid displacement to and from the fluid chamber 12 as described hereinabove.

Referring now to FIGS. 6–9, the tandemly operated link members 24 and 25 require separate installation within the nut structure 20 due to the extending shaft portions which must be inserted through the journaling apertures 20b. Accordingly, a novel method of assembly is enabled by respective clearance surfaces 24b, 25b which are arranged on the respective link members in recessive angle relative to the axis of the shaft portions 24b. Referring now to FIG. 7, installation of link members begins by inserting one of the link members 24 between mounting arms 20b and then passing the bearing shaft portion 24a into the journal aperture 20c after which the bearing bore 24d is aligned with the holes in the housing flanges 24b for subsequent insertion of the bearing pin 26 therethrough. Thereafter, the other link member 25 (or 24) is inserted between the mounting arms 20b in orientation so that inclined clearance surface 25b is engaged or only slightly spaced from the inclined clearance surface 24b into the position shown in FIG. 8. In the illustrated embodiment, the conforming engagement of the clearance surfaces 25b and 24b will orient the link member 25 in inverted orientation relative to the link member 24 so that the shaft portion 25a can be inserted sufficiently between the mounting portions 20b for alignment with the journaling aperture 20c as shown in FIG. 8. Following passage of the link member shaft portion 25a into the journal aperture 20e as indicated by arrow D in FIG. 8, the link member 25a is rotated as indicated by arrow E under the guidance of the journal 20c, until the link member 25 becomes aligned in mirror image orientation with link member 24 including oppositely inclined clearance spaces 24b and 25b. Thereafter the bearing pin 26 can be inserted through the aligned bearing bores 24d and 25d in the respective link members in a fully assembled release mechanism 22 shown in FIG. 2.

Figure 11:
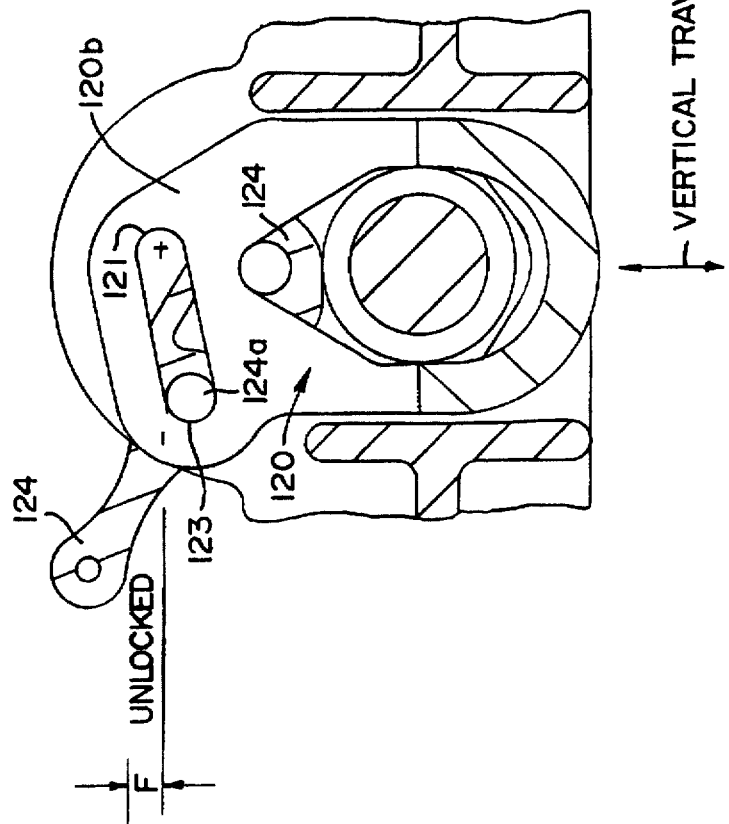
FIGS. 10 and 11 are fragmentary, partially sectional end views of a second embodiment of an actuating mechanism in accordance with the invention.
Figure 10:
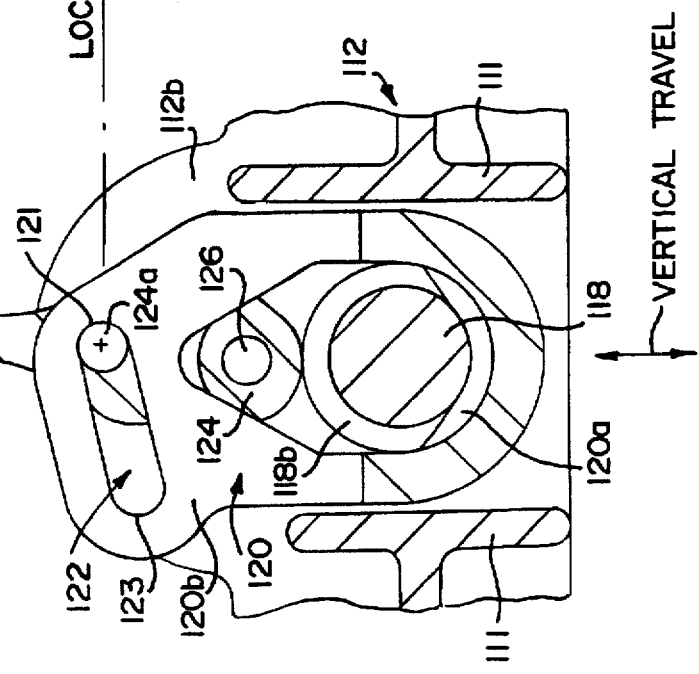

Referring now to FIGS. 10 and 11, a second embodiment of a release mechanism in accordance with the present invention is generally designated 122. The mechanism 122 has a locking lever 124 which is manually pivoted on bearing pin 126 secured within the syringe body 112 and bridging the base of the spaced flanges 112b. The nut structure 120 is guided in reversible vertical travel to selectively engage or disengage partial threaded portion 120a with screw threads 118b in a vertically sliding motion. The vertical sliding motion of the nut structure 120 is achieved by manual displacement of the locking lever 124 which has at least one camming pin 124a projecting from the side of the lever. When the locking lever 124 is pivoted, the camming pin 124a travels through the inclined cam slot 122d formed in the respective mounting arm 120b of the nut structure 120, so that the camming pin 124a moving in slot 122d will drive the partially threaded nut member 120 vertically between the positions of FIGS. 10 and 11 to selectively engage and disengage the partially threaded portion 120a with the threads 118b on the plunger. The portion 120b which extends from the partially threaded portion 120a in effect defines an integral carriage portion. It should be noted that a pair of mounting arm portions 120b may be employed with the locking lever 124 disposed therebetween, the lever being provided with a pair of pins and each of the arm portions 120b with a cam slot receiving one of said pins. The reversible sliding motion of the nut structure 120 is guided by confining engagement against the syringe body side walls 111 or alternatively by similarly guiding ribs or pins engaged in linear track (not shown).

The length of reversible vertical travel of the nut structure 120 between the positions of FIGS. 10 and 11 is graphically represented by the distance between arrow heads F representing the displacement of the upper slot end 121. In the thread-engaged position of the nut structure 120 shown in FIG. 10, the locking lever 124 leans slightly "over center"at a small angle G from vertical as shown in FIG. 10. The "over center"locking position of the lever 124 ensures that any slight motion of the lever 124 which could be induced by the fluid pressure in the syringe body (not shown) imposed on the screw 118 will be a displacement of the lever 124 toward the vertical position resulting in tighter engagement of the screw 118 and the nut structure 120 rather than any tendency for loosening or disengagement thereof.

In summary of operation, the inflator device is primed with a sterile saline solution aspirated into the cavity of the syringe body after which the supply tube is disconnected. The syringe is then coupled to a balloon catheter which has been previously positioned within a blood vessel as for example a heart valve or in the approximate area of an artery or vein that is blocked with plaque. The syringe plunger is then advanced and retracted for selectively applying and relieving fluid pressure to the balloon, in a repetitive manner which is facilitated by both a rapid sliding of the screw plunger and a slower threaded displacement of the screw plunger enabled by the quick release mechanism for actuating selective engagement and disengagement of the nut structure with the screw plunger. The pressure is accurately monitored during the angioplasty procedure by the incorporated pressure gauge.

While preferred embodiments and applications of the present invention are shown and described, it is envisioned that those skilled in the art may devise various modifications and equivalents without departing from the spirit and scope of the appended claims.

The invention claimed is:

1. An actuating mechanism for rapidly and selectively moving a threaded screw and nut member combination into or out of threaded engagement, and including a housing and threaded screw structure slidable displaceable through said housing; a nut member having partial threads engageable and disengageable with said threaded screw structure; a carriage structure associated with said nut member and arranged to enable reversibly translating motion together with said nut member relative to said screw structure to enable said selectively threaded engageability of said partial threads with said screw structure; a link structure arranged to couple said carriage structure to said housing, wherein said link structure comprises a plurality of link members at least one of which is arranged to enable separate coupling thereof with said carriage structure.

2. An actuating mechanism according to claim 1, wherein at least one of said link members includes a rotatable bearing shaft portion journaled in said carriage structure.

3. An actuating mechanism according to claim 1, wherein said link structure comprises a pair of adjacently arranged link members at least one of which is coupled to said carriage structure.

4. An actuating mechanism according to claim 1, wherein said link structure comprises a pair of abutting link members.

5. An actuating mechanism according to claim 4, wherein each of said link members is rotatably mounted on said housing structure.

6. An actuating mechanism according to claim 5, wherein said carriage structure comprises a bifurcated portion defining a pair of opposingly spaced mounting portions and wherein said link members are disposed between said mounting portions.

7. An actuating mechanism according to claim 6, wherein said link members have abutting surfaces.

8. An actuating mechanism according to claim 7, wherein each of said link members includes a rotatable bearing shaft portion journaled within a respective one of said mounting portions, whereby each of said bearing shaft portions must be separately insertable into said respective mounting portion journal.

9. An actuating mechanism according to claim 8, wherein said link members are disposed between said carriage structure mounting portions, said link members being further arrangeable in mirror image alignment and having abutting surfaces.

10. An actuating mechanism according to claim 9, wherein said link members have respective configurations requiring separate insertion of said respective bearing shaft portions in a non-mirror image position whereby a link member must thereafter be rotated to obtain said mirror image alignment.

11. An actuating mechanism according to claim 10, wherein each of said link members includes a respective clearance surface thereon which are arranged to enable abutment thereof when said link members are in said non-mirror image position and are disengageable to enable spaced relationship of said clearance surfaces when said link members are in said mirror image position rotation of said link members.

12. An actuating mechanism for rapidly and selectively moving a threaded screw and nut member combination into or out of threaded engagement, comprising: a housing and threaded screw structure slidably displaceable through said housing; a nut member having partial threads engageable and disengageable with said threaded screw structure; a carriage structure associated with said nut member and arranged to enable reversibly translating motion together with said nut member relative to said screw structure to enable said selectively threaded engageability of said partial threads with said screw structure; and a plurality of link members including respective rotatable bearing shaft portions thereof which are journalled within respective journal portions of said carriage structure, each of said linkage members being pivotably supported on said housing to link said carriage structure to said housing.

13. An actuating mechanism according to claim 12, wherein said link members are disposed between spaced mounting portions of said carriage structure, said link members being further arrangeable in mirror image alignment and having abutting surfaces.

14. An actuating mechanism according to claim 13, wherein said link members have respective configurations requiting separate journal insertion of said respective bearing shaft portions in a non-mirror image position whereby a link member must thereafter be rotated to obtain said mirror image alignment.

15. An actuating mechanism according to claim 14, wherein each of said link members includes a respective clearance surface thereon which are arranged to enable abutment thereof when said link members are in said non-mirror image position and are disengageable to enable spaced relationship of said clearance surfaces when said link members are in said mirror image position.

* * * * *

UNITED STATES PATENT AND TRADEMARK OFFICE
CERTIFICATE OF CORRECTION

PATENT NO. : 5,713,242
DATED : February 3, 1998
INVENTOR(S) : Rowland W. Kanner and Richard M. Davis It is certified that error appears in the above-indentified patent and that said Letters Patent is hereby corrected as shown below:

Column 2, Line 62 "oft he" should be -- of the --

Column 3, Line 26 "de" should be -- the --

Column 4, Line 23 "20e" should be -- 20c --

Column 4, Line 25 "fibs" should be -- ribs --

Column 4, Line 34 "fibs" should be -- ribs --

Column 5, Line 4 "20e" should be -- 20c --

Column 5, Line 5 "25A" should be --25 --

Column 6, Line 48 "beating" should be --bearing --

Column 6, Line 50 "beating" should be -- bearing --

Column 7, Line 3 "rotation of said link members" should be deleted

Column 8, Line 8 "requiting" should be -- requiring --

Signed and Sealed this

Eleventh Day of August 1998

Attest:

BRUCE LEHMAN

Attesting Officer

Commissioner of Patents and Trademarks